US 9,143,939 B2

(12) United States Patent
Nagasaki et al.

(10) Patent No.: US 9,143,939 B2
(45) Date of Patent: Sep. 22, 2015

(54) CONTROLLING DEVICE

(71) Applicants: Takeshi Nagasaki, Nagoya (JP); Hideki Nogawa, Nagoya (JP)

(72) Inventors: Takeshi Nagasaki, Nagoya (JP); Hideki Nogawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/966,839

(22) Filed: Aug. 14, 2013

(65) Prior Publication Data
US 2013/0332993 A1 Dec. 12, 2013

Related U.S. Application Data

(63) Continuation of application No. 13/048,424, filed on Mar. 15, 2011, now Pat. No. 8,516,579.

(30) Foreign Application Priority Data

Mar. 18, 2010 (JP) ................................. 2010-062112

(51) Int. Cl.
*H04L 29/06* (2006.01)
*H04W 12/06* (2009.01)
*H04L 12/24* (2006.01)
*G06F 11/00* (2006.01)
*G06F 12/14* (2006.01)
(Continued)

(52) U.S. Cl.
CPC ........... *H04W 12/06* (2013.01); *H04L 41/0806* (2013.01); *H04L 41/0869* (2013.01); *H04W 88/021* (2013.01)

(58) Field of Classification Search
None
See application file for complete search history.

(56) References Cited

U.S. PATENT DOCUMENTS 7,143,150 B1 * 11/2006 Nuggehalli .................... 709/221
7,253,915 B2 * 8/2007 Kemp et al. .................. 358/1.15
7,986,428 B2 * 7/2011 Karaoguz et al. ............. 358/1.15
(Continued)

FOREIGN PATENT DOCUMENTS

| JP | 2005-174134 A | 6/2005 |
| JP | 2006-287600 A | 10/2006 |
| JP | 2007-164680 A | 6/2007 |

OTHER PUBLICATIONS

EP Extended Search Report dtd Apr. 26, 2011, EP Appln. 11154720.4.

(Continued)

*Primary Examiner* — Shin-Hon Chen
(74) *Attorney, Agent, or Firm* — Banner & Witcoff, Ltd.

(57) ABSTRACT

A controlling device may acquire setting information regarding a wireless setting for a wireless communication currently being set in a wireless communication device. The controlling device may determine, using the setting information, whether the wireless setting indicates a first authentication method in which an authentication is performed by an authentication server or a second authentication method in which an authentication is performed by a device with which the wireless communication performing unit performs a wireless communication directly. The controlling device may provide a first screen to a displaying unit in a first case where a determination is made that the wireless setting indicates the first authentication method. The controlling device may provide a second screen which is different from the first screen to the displaying unit in a second case where a determination is made that the wireless setting indicates the second authentication method.

20 Claims, 8 Drawing Sheets

(51) Int. Cl.
*G06F 12/16* (2006.01)
*H04W 88/02* (2009.01)

(56) References Cited

U.S. PATENT DOCUMENTS

| | | |
|---|---|---|
| 2005/0048953 A1* | 3/2005 | Ohara .................. 455/412.1 |
| 2005/0148326 A1 | 7/2005 | Nogawa et al. |
| 2005/0272420 A1* | 12/2005 | Matsuda et al. .......... 455/426.2 |
| 2006/0230420 A1 | 10/2006 | Kawai et al. |
| 2007/0168572 A1 | 7/2007 | Miyazawa |
| 2009/0109941 A1* | 4/2009 | Carter .................. 370/338 |
| 2010/0031346 A1* | 2/2010 | Kano .................. 726/19 |
| 2010/0235895 A1* | 9/2010 | Grassley et al. .................. 726/7 |
| 2010/0246486 A1* | 9/2010 | Lin et al. .................. 370/328 |

OTHER PUBLICATIONS

Cisco Systems: "Cisco Aironet 802.11a/b/g Wireless LAN Client Adapters (CB21AG and PI21AG) Installation and Configuration Guide", Jun. 30, 2007, EP002632061, retrieved from http://www.cisco.com/en/US/docs/wireless/wlan_adapter/cb21ag/user/2.5/configuration/guide/RacerICG.pdf, retrieved Apr. 7, 2011, Ch. 4-7 and 10.

Hewlett Packarg: "HP Jetdirect Print ServersAdminstrator's Guide (Firmware V.38)", Feb. 2008, XP002632062, retrieved from http://h20000.www2.hp.com/bc/docs/support/SupportManual/c01502097/c01502097.pdf, retrieved Apr. 7, 2011, Ch. 4 and 8.

* cited by examiner

FIG. 2

| Authentication Method Type | Authentication Method | | Encryption Method | Internal Authentication Method |
|---|---|---|---|---|
| | Authentication Protocol | EAP Authentication Method | | |
| Enterprise Type (First Type of Authentication Method) | IEEE802.1X | LEAP | CKIP | — |
| | WPA-Enterprise | EAP-FAST | TKIP | NONE |
| | | | | MSCHAPv2 |
| | | | | GTC |
| | | | | TLS |
| | | PEAP | TKIP | MSCHAPv2 |
| | | | | GTC |
| | | | | TLS |
| | | EAP-TTLS | TKIP | CHAP |
| | | | | MSCHAP |
| | | | | MSCHAPv2 |
| | | | | PAP |
| | | | | TLS |
| | | EAP-TLS | TKIP | — |
| | WPA2-Enterprise | EAP-FAST | AES | NONE |
| | | | | MSCHAPv2 |
| | | | | GTC |
| | | PEAP | AES | MSCHAPv2 |
| | | | | GTC |
| | | | | TLS |
| | | EAP-TTLS | AES | CHAP |
| | | | | MSCHAP |
| | | | | MSCHAPv2 |
| | | | | PAP |
| | | EAP-TLS | AES | — |
| Personal Type (Second Type of Authentication Method) | WPA-PSK | — | TKIP | — |
| | | | AES | |
| | WPA2-PSK | — | TKIP | |
| | | | AES | |
| | Open | — | WEP | |
| | | — | — | |
| | Shared key | — | WEP | |

FIG. 5

Enterprise Screen 90

- 92 — Configure Wireless
- 94 — [Personal] Enterprise
- 96 — Current Status / Operating Mode / Channel 0 / Receiving Signal
- 100 — Communication Mode — 1) Infrastructure Mode — 100a
- 101 — Wireless Network Name(SSID) — SETUP [Browse] — 101a
- 102 — Channel — 11 — 102a
- 104 — Authentication Method — EAP-TLS — 104a
- 106 — Internal Authentication Method — 106a
- 108 — Encryption Mode — AES — 108a
- 110 — UserID — XXXX — 110a
- 112 — Password — 112a
- 114 — Client Certificate — Certificate 1 — 114a
- 116 — Server Certificate Verification — CA Cert. + Server ID — 116a
- 118 — ServerID — 118a Configure Certificate

[Cancel] [Submit]
120      122

FIG. 6

Personal Screen 190

Configure Wireless

| Personal | Enterprise |

Current Status
- Operating Mode
- Channel 0
- Receiving Signal

- Communication Mode: 1) Infrastructure Mode
- Wireless Network Name(SSID): SETUP [Browse]
- Channel: 11

- Authentication Method: Shared key
- Encryption Mode: WEP

- Network Key  Use  Key
  - WEP Key1  ⊙  •••
  - WEP Key2  ○  •••
  - WEP Key3  ○  •••
  - WEP Key4  ○  •••

- Passphrase: [          ]

[Cancel] [Submit]

FIG. 8

| Authentication Method | | UserID | Password | Client Certification | Server Certification | ServerID |
|---|---|---|---|---|---|---|
| LEAP | | O | O | × | × | × |
| EAP-FAST | Server ID Setting : NO | O | O | × | O | × |
| | Server ID Setting : YES | O | O | × | O | O |
| PEAP | Server ID Setting : NO | O | O | × | O | × |
| | Server ID Setting : YES | O | O | × | O | O |
| EAP-TTLS | Server ID Setting : NO | O | O | × | O | × |
| | Server ID Setting : YES | O | O | × | O | O |
| EAP-TLS | Server ID Setting : NO | O | × | O | O | × |
| | Server ID Setting : YES | O | × | O | O | O |

O : Target Setting Item Used for Error Decision

CONTROLLING DEVICE

CROSS-REFERENCE TO RELATED APPLICATIONS

This application is a continuation of prior U.S. application Ser. No. 13/048,424, filed Mar. 15, 2011, which claims priority to Japanese Patent Application No. 2010-062112, filed on Mar. 18, 2010, the contents of which are hereby incorporated by reference into the present application.

TECHNICAL FIELD

The present specification discloses a controlling device for a wireless communication device that performs a wireless communication.

DESCRIPTION OF RELATED ART

There is a technique in order to set a wireless setting (authentication method, encryption method and the like) in a printer for the printer to perform a wireless communication. A user is able to designate the wireless setting to be set in the printer via a screen displayed on a displaying unit of a PC. The PC sends the wireless setting which was designated by the user to the printer. The printer sets the wireless setting received from the PC as its own wireless setting.

SUMMARY

There is a case where a user wishes to confirm a wireless setting currently being set in a wireless communication device (the printer in the foregoing example). This specification discloses a technique for supporting confirmation of the wireless setting currently being set in the wireless communication device.

The technique taught by the present specification is a controlling device for a wireless communication device comprising a wireless communication performing unit configured to perform a wireless communication. The controlling device may comprise an acquiring unit, a determining unit and a providing unit. The acquiring unit may be configured to acquire setting information regarding a wireless setting for a wireless communication currently being set in the wireless communication device. The determining unit may be configured to determine, using the setting information, whether the wireless setting indicates a first type of authentication method in which an authentication is performed by an authentication server or a second type of authentication method in which an authentication is performed by a device with which the wireless communication performing unit performs a wireless communication directly. The providing unit may be configured to provide a first screen to a displaying unit in a first case where a determination is made that the wireless setting indicates the first type of authentication method. The first screen may indicate contents of a plurality of setting items included in the wireless setting. The providing unit may be configured to provide a second screen which is different from the first screen to the displaying unit in a second case where a determination is made that the wireless setting indicates the second type of authentication method. The second screen may indicate contents of a plurality of setting items included in the wireless setting.

Note that a method, a computer program and a non-transitory computer readable medium including a computer program for the foregoing controlling device are also novel and useful. Moreover, a device comprising the foregoing controlling device, and a system comprising the device are also novel and useful.

BRIEF DESCRIPTION OF THE DRAWINGS

FIG. 2 shows a table for explaining an authentication method.

FIG. 5 shows an example of an enterprise screen.

FIG. 6 shows an example of a personal screen.

FIG. 8 shows a table for explaining target setting items of used for an error decision.

EMBODIMENT

Figure 1:
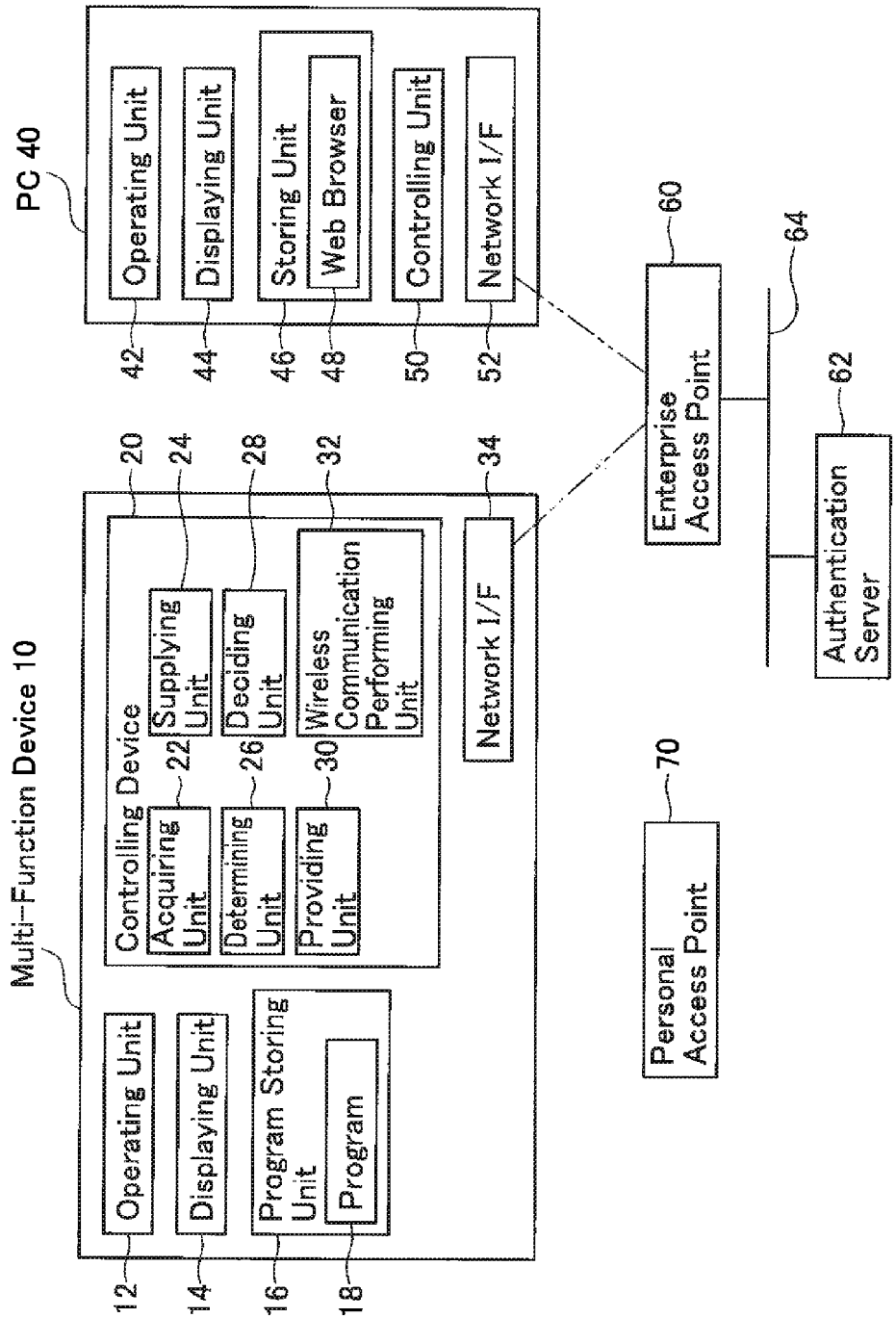
FIG. 1 shows an example of a configuration of a wireless communication system.

An embodiment is now explained with reference to the drawings. As shown in FIG. 1, a wireless communication system 2 comprises a multi-function device (peripheral device) 10, a PC 40, an enterprise access point 60 (an "access point" is hereinafter referred to as an "AP"), an authentication server 62, and a personal AP 70. If a wireless setting for a wireless connection with the enterprise AP 60 is set in the multi-function device 10, the multi-function device 10 can communicate wirelessly with the enterprise AP 60. Note that, in this embodiment, the term "wireless connection" is used in the following context. Specifically, in a state where a device is in a "wireless connection" with the AP, that device is able to communicate with another device via the AP. Meanwhile, if a device is not in a "wireless connection" with the AP, that device can perform wireless communication with the AP (e.g., the wireless communication of authentication information described later), but is unable to communicate with another device via the AP. If a wireless setting for a wireless connection with the personal AP 70 is set in the multi-function device 10, the multi-function device 10 can communicate wirelessly with the personal AP 70. Similarly, the PC 40 can achieve a wireless connection with the enterprise AP 60 or the personal AP 70 according to its own wireless setting. In this embodiment, the wireless settings are set (registered) respectively in the multi-function device 10 and the PC 40 so that the multi-function device 10 and the PC 40 can achieve a wireless connection with the same AP respectively. Specifically, the multi-function device 10 and the PC 40 can mutually communicate via either the AP 60 or the AP 70. Note that, as shown with the two-dot chain line, FIG. 1 shows an example where the multi-function device 10 and the PC 40 can mutually communicate via the enterprise AP 60. The enterprise AP 60 can communicate with the authentication server 62 via a wired LAN 64.

Configuration of Multi-function Device

As shown in FIG. 1, the multi-function device 10 comprises an operating unit 12, a displaying unit 14, a program storing unit 16, a controlling device 20, and a network interface 34. Note that the multi-function device 10 further comprises a scanning unit and a printing unit not shown. The operating unit 12 is configured from a plurality of buttons to be operated by a user. The displaying unit 14 is a display for displaying various types of information. The program storing unit 16 stores a program 18 which is performed by the controlling device 20. The controlling device 20 performs various types of processes according to the program 18 stored in the program storing unit 16. As a result of the controlling device 20 performing process according to the program 18, the respective functions of an acquiring unit 22, a supplying unit 24, a determining unit 26, a deciding unit 28, a providing unit 30, and a wireless communication performing unit 32 are realized. Note that the wireless communication performing unit 32 stores the wireless setting for the multi-function device 10 to achieve a wireless connection with either the AP 60 or the AP 70, and thereby achieves the wireless connection with either the AP 60 or the AP 70 according to the stored wireless setting. According to the above configuration, the wireless communication performing unit 32 is able to communicate with another device (e.g., the PC 40) via an AP to which the multi-function device 10 is wirelessly connected. The network interface 34 is an interface for the multi-function device 10 to perform the wireless connection.

Configuration of PC

The configuration of the PC 40 is now explained. The PC 40 comprises an operating unit 42, a displaying unit 44, a storing unit 46, a controlling unit 50, and a network interface 52. The operating unit 42 is configured from a keyboard and a mouse to be operated by a user. The displaying unit 44 is a display for displaying various types of information. The storing unit 46 stores a web browser 48. The storing unit 46 additionally stores a wireless setting for the PC 40 to achieve a wireless connection with either the AP 60 or the AP 70. The controlling unit 50 achieves a wireless connection with either the AP 60 or the AP 70 according to the wireless setting stored in the storing unit 46. The controlling unit 50 is thereby able to communicate data with another device (e.g., the multi-function device 10) via an AP to which the PC 40 is wirelessly connected. In particular, the controlling unit 50 causes the displaying unit 44 to display a screen presented by screen data provided from another device (e.g., the multi-function device 10) via the AP to which the PC 40 is wirelessly connected according to the web browser 48 stored in the storing unit 46. The network interface 52 is an interface for the PC 40 to perform the wireless communication.

Type of Authentication Method of AP

An administrator of the wireless communication system 2 sets in advance the wireless setting for operating according to an enterprise type authentication method (first type of authentication method; refer to FIG. 2) in the enterprise AP 60. When an external device (e.g., the multi-function device 10) attempts to achieve a wireless connection with the enterprise AP 60, the enterprise AP 60 causes the authentication server 62 to authenticate the external device according to the wireless setting that is set in itself (AP 60). The administrator also sets in advance the wireless setting for operating according to a personal type authentication method (second type of authentication method; refer to FIG. 2) in the personal AP 70. When an external device attempts to achieve a wireless connection with the personal AP 70, the personal AP 70 causes itself (AP 70) to authenticate the external device according to the wireless setting that is set in itself (AP 70).

Enterprise Type Authentication Method

FIG. 2 shows an example of the authentication methods that are available to both the multi-function device 10 and the PC 40. The authentication method is classified into an enterprise type authentication method and a personal type authentication method. The enterprise type authentication method is classified into three types of authentication methods according to three types of authentication protocols of IEEE (The Institute of Electrical and Electronics Engineers) 802.1X, WPA (WiFi-Protected Access)-Enterprise and WPA2-Enterprise. The WPA-Enterprise conforms to IEEE802.1x, and is a standard that was further expanded, and is a standard that was formulated based on Wi-Fi Alliance. The WPA2-Enterprise is a standard that was further expanded upon incorporating the WPA-Enterprise, and is a standard that was formulated based on the Wi-Fi Alliance. Specifically, the enterprise type authentication method is an authentication method for achieving wireless communication using IEEE802.1x. The two types of authentication methods of the WPA-Enterprise and the WPA2-Enterprise are both further classified into a plurality of EAP (Extensible Authentication Protocol) authentication methods. The plurality of EAP authentication methods includes EAP-FAST (EAP-Flexible Authentication via Secured Tunnel), PEAP (Protected EAP), EAP-TTLS (EAP-Tunneled Transport Layer Security), and EAP-TLS (EAP-Transport Layer Security). The EAP authentication method of IEEE802.1X is LEAP (Lightweight EAP).

The LEAP of IEEE802.1X uses an encryption method of CKIP (Cisco Key Integrity Protocol). The respective EAP authentication methods of the WPA-Enterprise uses an encryption method of TKIP (Temporal Key Integrity Protocol). Meanwhile, the respective EAP authentication methods of the WPA2-Enterprise use an encryption method of AES. The enterprise AP 60 and the external device encrypt data to be communicated according to a pre-set encryption method, and thereby perform data communication.

If the EAP authentication method is EAP-FAST, PEAP, or EAP-TTLS, each EAP authentication method is classified into a plurality of internal authentication methods. Specifically, the authentication method differs according to a combination of the EAP authentication method and the internal authentication method. The internal authentication method is classified into NONE, MSCHAP (Microsoft Challenge Handshake Authentication Protocol), MSCHAP v2 (MSCHAP version2), GTC (Generic Token Card), TLS (Transport Layer Security), and PAP (Password Authentication Protocol). Note that the foregoing "NONE" is one type of internal authentication method, and does not mean that an internal authentication method does not exist. The available internal authentication method differs according to the EAP authentication method. For example, with EAP-FAST, one internal authentication method among NONE, MSCHAP v2, GTC, and TLS is available, and with PEAP, one internal authentication method among MSCHAP v2, GTC, and TLS is available. Meanwhile, if the EAP authentication method is LEAP or EAP-TLS, the EAP authentication method is not classified based on the internal authentication method. Note that if LEAP, EAP-FAST, PEAP, or EAP-TTLS is used, the authentication server 62 authenticates the external device (e.g., the multi-function device 10) with a user ID and a password. Meanwhile, if EAP-TLS is used, the authentication server 62 authenticates the external device using a user ID and a client certificate.

Personal Type Authentication Method

The personal type authentication method is classified into four types of authentication method according to four types of authentication protocols of WPA-PSK (WPA-Pre-shared Key), WPA2-PSK, Open, and Shared key. Note that "Open" is a protocol for which an authentication is not performed, but is treated as one type of authentication method in this specification. The personal type authentication method is an authentication method for achieving a wireless communication that does not use IEEE802.1x. WPA-PSK and WPA2-PSK use an encryption method of TKIP or AES. Open uses an encryption method of WEP (Wired Equivalent Privacy), or does not use an encryption method. Shared key uses the encryption method of WEP. The personal AP 70 and the external device encrypt data to be communicated according to a pre-set encryption method, and thereby perform data communication. Note that if WEP is used as the encryption method, the personal AP 70 and the external device encrypt data with a WEP key. In the case of WPA-PSK or WPA2-PSK, the personal AP 70 authenticates the external device (e.g., the multi-function device 10) with a passphrase (password).

Wireless Setting of Respective Devices for using Enterprise Type Authentication Method If the user of the multi-function device 10 wishes to wirelessly connect the multi-function device 10 with the enterprise AP 60, the user pre-sets a wireless setting including the enterprise type authentication method (hereinafter referred to as the "enterprise type wireless setting") in the multi-function device 10. This setting operation may be performed, e.g., by operating the operating unit 12 (refer to FIG. 1) of the multi-function device 10, or by operating the operating unit of the external device such as the PC 40. The user designates one type of EAP authentication method among the five types of EAP authentication methods (LEAP, EAP-FAST, PEAP, EAP-TTLS, EAP-TLS). If LEAP is designated as the EAP authentication method, the encryption method of CKIP is designated even without any designation by the user. If an authentication method other than LEAP is designated as the EAP authentication method, the user further designates one type of encryption method of either TKIP or AES. Moreover, if EAP-FAST, PEAP, or EAP-TTLS is designated as the EAP authentication method, the user further designates one type of internal authentication method among the plurality of types of internal authentication methods corresponding to the designated EAP authentication method.

Note that if LEAP, EAP-FAST, PEAP, or EAP-TTLS is designated as the EAP authentication method, the user further designates the same user ID and password as the user ID and password registered in the authentication server 62 (refer to FIG. 8). The user needs to register the user ID and password in the authentication server 62 in advance. Meanwhile, if EAP-TLS is designated as the EAP authentication method, the user further designates the same user ID and client certificate as the user ID and client certificate registered in the authentication server 62 (refer to FIG. 8). The user needs to register the user ID and client certificate in the authentication server 62 in advance.

Each of information designated by the user (i.e., the enterprise type wireless setting) is stored in the wireless communication performing unit 32. The enterprise type wireless setting is thereby set in the multi-function device 10. The wireless communication performing unit 32 uses the enterprise type wireless setting and attempts to achieve a wireless communication with the enterprise AP 60. Specifically, the wireless communication performing unit 32 wirelessly sends, to the enterprise AP 60, the respective pieces of information (the EAP authentication method, encryption method, internal authentication method, user ID, password, and client certificate) contained in the enterprise type wireless setting. The enterprise AP 60 sends the respective pieces of information received from the multi-function device 10 to the authentication server 62 via the wired LAN 64. The authentication server 62 uses the respective pieces of information received from the enterprise AP 60 and performs authentication. This authentication includes, e.g., the authentication on whether the authentication server 62 supports the EAP authentication method received from the enterprise AP 60, and the authentication on whether the user ID and password (or user ID and client certificate) received from the enterprise AP 60 are registered in the authentication server 62. The authentication server 62 sends the authentication result to the enterprise AP 60. The enterprise AP 60 allows the multi-function device 10 to be wirelessly connected to the enterprise AP 60 if the authentication result is successful, and prohibits the multi-function device 10 from being wirelessly connected to the enterprise AP 60 if the authentication result is unsuccessful.

Wireless Setting of Respective Devices for using Personal Type Authentication Method If the user of the multi-function device 10 wishes to wirelessly connect the multi-function device 10 with the personal AP 70, the user pre-sets a wireless setting including the personal type authentication method (hereinafter referred to as the "personal type wireless setting") in the multi-function device 10. The user designates one type of authentication method among four types of authentication methods (WPA-PSK, WPA2-PSK, Open, Shared key). If WPA-PSK or WPA2-PSK is designated as the authentication method, the user further designates one type of encryption method of either TKIP or AES. If Open is designated as the authentication method, the user designates an encryption method of WEP or designates "no encryption." Moreover, if Shared Key is designated as the authentication method, the encryption method of WEP is automatically designated even without any designation by the user. Note that if WPA-PSK or WPA2-PSK is designated as the authentication method, the user further designates the same passphrase as the passphrase registered in the personal AP 70. The user needs to register the passphrase in the personal AP 70 in advance. Meanwhile, if Open or Shared Key is designated as the authentication method and WEP is designated as the encryption method, the user further designates the same WEP Key as the WEP Key registered in the personal AP 70. The user needs to register the WEP Key in the personal AP 70 in advance.

The respective pieces of information designated by the user (i.e., the personal type wireless setting) are stored in the wireless communication performing unit 32. The personal type wireless setting is thereby set in the multi-function device 10. The wireless communication performing unit 32 uses the personal type wireless setting and attempts to achieve a wireless connection with the personal AP 70. Specifically, the personal AP 70 performs authentication according to the authentication method and the encryption method, and allows the multi-function device 10 to be wirelessly connected to the personal AP 70 if the authentication result is successful, and prohibits the multi-function device 10 from being wirelessly connected to the personal AP 70 if the authentication result is unsuccessful.

As with the case of the multi-function device 10, the enterprise type wireless setting is set in the PC 40 if the user of the PC 40 wishes to wirelessly connect the PC 40 with the enterprise AP 60, and the personal type wireless setting is set in the PC 40 if the user wishes to wirelessly connect the PC 40 with the personal AP 70. The controlling unit 50 of the PC 40 uses the wireless setting and attempts to achieve a wireless connection with the enterprise AP 60 or the personal AP 70. The PC 40 is wirelessly connected with the enterprise AP 60 or the personal AP 70 if the authentication result is successful.

Process Performed by Multi-function Device

The wireless setting change process performed by the multi-function device 10 is now explained with reference to FIG. 3. The user of the PC 40 can input a command to the operating unit 42 for accessing the multi-function device 10. In the foregoing case, the controlling unit 50 of the PC 40 accesses the multi-function device 10 according to the web browser 48 via the AP to which the PC 40 is wirelessly connected. The providing unit 30 of the multi-function device 10 thereby provides screen data representing a predetermined screen to the PC 40. Specifically, the providing unit 30 supplies the screen data to the wireless communication performing unit 32, and the wireless communication performing unit 32 supplies the screen data to the PC 40 via the AP. The screen data is in a format (e.g., HTML (Hyper Text Markup Language) data) that can be interpreted by the controlling unit 50 of the PC 40 according to the web browser 48. The user can input a command to the operating unit 42 for requesting a screen indicating the configuration of the network to which the multi-function device 10 is connected on the foregoing predetermined screen displayed on the displaying unit 44 of the PC 40. When the foregoing command is input by the user, the controlling unit 50 of the PC 40 sends a send request of the network configuration screen 80 (refer to FIG. 4) to the multi-function device 10. When the controlling device 20 of the multi-function device 10 receives the send request of the network configuration screen 80 from the PC 40, it starts the setting change process of FIG. 3.

Figure 4:
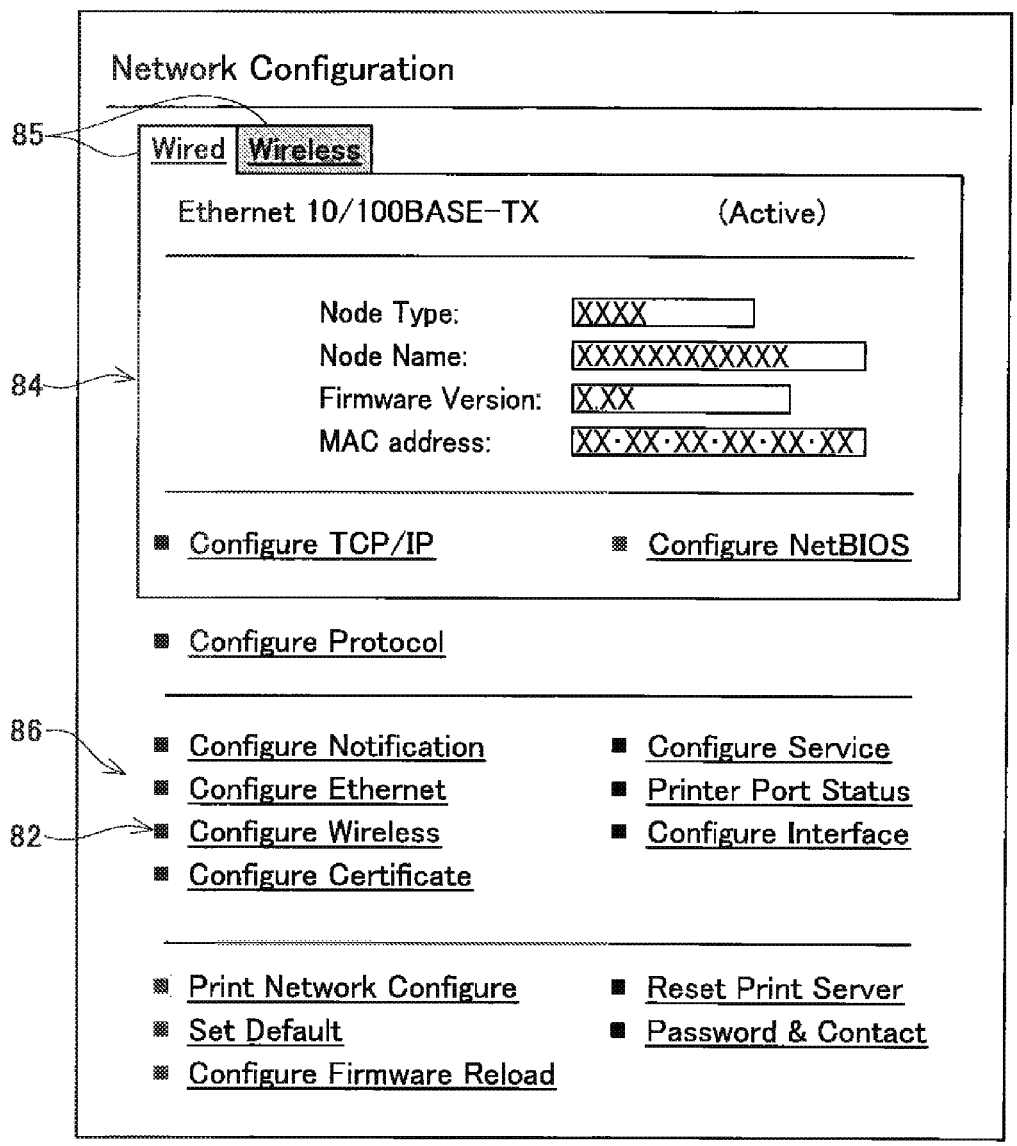
FIG. 4 shows an example of a network configuration screen.

The providing unit 30 of the multi-function device 10 provides the network configuration screen 80 to the PC 40 (S12). The controlling unit 50 of the PC 40 displays the network configuration screen 80 received from the multi-function device 10 on the displaying unit 44 (refer to FIG. 1). As shown in FIG. 4, the network configuration screen 80 includes an identifying information display area 84 for displaying the identifying information of the multi-function device 10, and a plurality of selecting areas 86 for requesting a screen for setting the respective setting items of the communication setting. The identifying information display area 84 displays the Node Type set in the multi-function device 10, Node Name, Firmware Version, MAC Address and the like. By operating the operating unit 42 (refer to FIG. 1) of the PC 40, the user can select one of the two tabs 85 of "Wired" or "Wireless" disposed above the identifying information display area 84. If the user selects "Wired," the respective pieces of information (Node Type and the like) used achieving a wired connection of the multi-function device 10 with the external device are displayed on the identifying information display area 84, and if the user selects "Wireless," the respective pieces of information used upon wirelessly connecting the multi-function device 10 with the external device are displayed.

A plurality of character strings corresponding to the plurality of setting items concerning the communication setting of the multi-function device 10 is displayed on the plurality of selecting areas 86. The user can operate the operating unit 42 and select one selecting area among the plurality of selecting areas 86. For example, if a selecting area 82 described with a character string of "Configure Wireless" is selected by the user, the controlling unit 50 of the PC 40 sends a packet indicating that "Configure Wireless" was selected to the multi-function device 10. The controlling device 20 of the multi-function device 10 is monitoring the selection of "Configure Wireless" (S14). If the result is YES in the foregoing case, the routine proceeds to S16. Note that if a selecting area described with a specific character string (e.g., "Configure Interface") other than "Configure Wireless" is selected, the controlling unit 50 of the PC 40 sends a packet indicating that the foregoing specific character string was selected to the multi-function device 10. In the foregoing case, the controlling device 20 determines the result to be NO at S14. In the foregoing case, the providing unit 30 provides a screen corresponding to the packet from the PC 40 to the PC 40. At S16, the acquiring unit 22 (refer to FIG. 1) acquires the wireless setting stored in the wireless communication performing unit 32 (i.e., the wireless setting being set in the multi-function device 10). The wireless setting includes the authentication method information indicating the authentication method. The authentication method information indicates one among LEAP, EAP-FAST, PEAP, EAP-TTLS, EAP-TLS, WPA-PSK, WPA2-PSK, Open, and Shared key. Subsequently, the determining unit 26 (refer to FIG. 1) determines whether the authentication method information contained in the wireless setting acquired at S16 shows the personal type authentication method (specifically, WPA-PSK, WPA2-PSK, Open, or Shared key) (S18). If the result is YES at S18, the routine proceeds to S30, and if the result is NO, the routine proceeds to S20.

At S20, the providing unit 30 generates screen data representing the enterprise screen 90 (refer to FIG. 5), and provides the screen data to the PC 40 by using the wireless setting (i.e., the enterprise type wireless setting) acquired at S16. Meanwhile, at S30, the providing unit 30 generates screen data representing the personal screen 190 (refer to FIG. 6), and provides the screen data to the PC 40 by using the wireless setting (i.e., the personal type wireless setting) acquired at S16.

Configuration of Enterprise Screen

As shown in FIG. 5, the enterprise screen 90 includes a status display area 96 and a setting display area 98. The status (Current Status) of the current wireless connection of the multi-function device 10 is displayed on the status display area 96. For example, the channel that is being used in the wireless connection and the status of the wireless communication (e.g., the status of receiving signals, status of sending signals, standby state and the like) are displayed. A plurality of setting items 100 to 118 are displayed on the setting display area 98. Each of the setting items 100 to 118 is an association of a character string (e.g., "Authentication Method") showing that setting item and a content (hereinafter referred to as the "content information") of the setting item being set in the multi-function device 10.

The respective setting items 100 to 118 are now explained. The content information of the setting item 100 (Communication Mode) indicates the communication mode being set in the multi-function device 10. The communication mode includes an infrastructure mode (mode of wireless communication via an AP), and an ad-hoc mode (mode of wireless communication that does not go through an AP). The content information of the setting item 101 (Wireless Network Name (SSID)) indicates the wireless network name ("SETUP" in the example of FIG. 5) being set in the multi-function device 10. The content information of the setting item 102 (Channel) indicates the number ("11" in the example of FIG. 5) of the channel of wireless communication being set in the multi-function device 10.

The content information of the setting item 104 (Authentication Method) indicates the EAP authentication method (EAP-TLS in the example of FIG. 5) being set in the multi-function device 10. The content information of the setting item 106 (Internal Authentication Method) indicates the internal authentication method being set in the multi-function device 10. The content information of the setting item 108 (Encryption Mode) indicates the encryption method (AES in the example of FIG. 5) being set in the multi-function device 10. Note that a character string indicating a setting item not being set in the multi-function device 10 is displayed in a mode that is different from the character strings indicating the setting items being set in the multi-function device 10. Specifically, the character string of the former item is displayed in the color that is lighter than the character strings of the latter items. In addition, nothing is displayed (i.e., it is blank) in the area for displaying the content information of the setting items that are not currently set in the multi-function device 10. In the example of FIG. 5, the EAP authentication method that is currently set in the multi-function device 10 is EAP-TLS. As described above, since EAP-TLS is not classified based on the internal authentication method, the character string (Internal Authentication Method) indicating the setting item 106 of the internal authentication method is displayed in a color that is lighter than the other character strings (e.g., the Encryption Mode), and nothing is displayed in the area for displaying the content information of the setting item 106 of the internal authentication method.

The content information of the setting item 110 (User ID) indicates the user ID being set in the multi-function device 10. The content information of the setting item 112 (Password) indicates the password being set in the multi-function device 10. Note that if the EAP authentication method is EAP-TLS, since a password is not used for performing the authentication, the character string (Password) indicating the setting item 112 of the password is displayed in a color that is lighter than the other character strings. In addition, nothing is displayed in an area 112a for displaying the content information of the setting item 112 of the password.

The content information of the setting item 114 (Client Certificate) indicates the certificate ID ("Certificate 1" in the example of FIG. 5) of the client certificate being set in the multi-function device 10. The content information of the setting item 116 (Server Certificate Verification) is the verification method being set in the multi-function device 10, and indicates the verification method for verifying the certificate (hereinafter referred to as the "server certificate") of the authentication server 62. Note that, as this verification method, there are the followings; namely, a method of verifying only the server certificate (CA Cert.), a method of verifying the server certificate and the server ID (CA Cert.+Server ID), and a method of not performing the verification (None). One method among the foregoing three methods is set in the multi-function device 10. With the method of verifying only the server certificate, the multi-function device 10 acquires the server certificate from the authentication server 62, and uses the acquired server certificate and the CA (Certification Authority) certificate pre-stored in the multi-function device 10 to authenticate the authentication server 62. With the method of verifying the server certificate and the server ID, in addition to the method of verifying the server certificate with the CA certificate, the authentication server 62 is authenticated by determining whether the common name contained in the server certificate coincides with the server ID that is pre-set in the multi-function device 10. Specifically, the server ID is identifying information for confirming that the server certificated acquired by the multi-function device 10 from the authentication server 62 is the server certificate chosen by the user. Note that if an authentication method other than LEAP is set as the EAP authentication method, the foregoing verification can be performed. Meanwhile, if LEAP is set as the EAP authentication method, the foregoing verification cannot be performed. Moreover, the content information of the setting item 118 (Server ID) indicates the server ID being set in the multi-function device 10. If the content information of the setting item 116 indicates "CA Cert.+Server ID," the server ID is displayed in an area 118a for displaying the content information of the setting item 118, and, if the content information of the setting item 116 indicates "CA Cert." or "None," a server ID is not displayed in the area for displaying the content information of the setting item 118.

The user can operate the operating unit 42 (refer to FIG. 1) of the PC 40 and change the contents of the plurality of setting items 100 to 118 displayed on the enterprise screen 90. For example, the user can operate the operating unit 42 and change the content of the setting item 101 (Wireless Network Name (SSID)). Specifically, when the Browse button 101a is operated by the user, operating information is sent to the multi-function device 10. The controlling device 20 of the multi-function device 10 searches for the AP according to the received operating information. The controlling device 20 specifies the SSID of the enterprise AP among the detected APs (e.g., specifies from the information contained in the Probe Response from the AP), and creates an SSID list. The providing unit 30 sends the SSID list to the PC 40. The controlling unit 50 of the PC 40 causes the displaying unit 44 to display the SSID list. The user can operate the operating unit 42 and select one SSID from the SSID list displayed on the displaying unit 44. The selected one SSID is displayed in the area for displaying the content information of the setting item 101. Note that, in this stage, the wireless setting of the multi-function device 10 is not yet changed to the selected SSID. The wireless setting of the multi-function device 10 is changed when the Submit button 122 described later is operated, and it is determined that there is no error in the error decision process (S24 of FIG. 3) described later.

The user can also use the operating unit 42 to operate the button 104a of the setting item (Authentication Method) 104 and change the content of the setting item 104. When the button 104a is operated, the controlling unit 50 of the PC 40 displays a list of five types of EAP authentication method available to (supported by) the multi-function device 10. When the user selects one type of EAP authentication method from the EAP authentication method list displayed on the displaying unit 44, the selected EAP authentication method is displayed in the area for displaying the content information of the setting item 104.

The display mode of the enterprise screen 90 differs depending on the selected EAP authentication method. For example, if EAP-FAST is selected as the EAP authentication method, while it is necessary to set the internal authentication method, the encryption method, the user ID and the password, there is no need to set the client certificate. Accordingly, in this embodiment, if EAP-FAST is selected, the enterprise screen 90 is updated so that the character string (Client Certificate) indicating the setting item 114 is displayed in a mode that is different from (specifically, in a color that is lighter than) the other character strings. Consequently, the user can easily know which setting items need to be set by viewing the updated enterprise screen 90.

Note that the foregoing update can also be realized, e.g., according to the following method. The controlling unit 50 of the PC 40 sends the operating information indicating the selected EAP authentication method to the multi-function device 10. The controlling device 20 of the multi-function device 10 sends update information (e.g., screen data representing the updated enterprise screen 90) for updating the enterprise screen 90 to the PC 40 based on the operating information. The controlling unit 50 of the PC 40 updates the enterprise screen 90 based on the update information. Otherwise, the foregoing update may also be realized, e.g., according to the following method. The controlling unit 50 of the PC 40 acquires in advance various types of update information for updating the enterprise screen 90 according to the various operations by the user simultaneously with the screen data of the enterprise screen 90 to be initially displayed. The controlling unit 50 of the PC 40 updates the enterprise screen 90 based on the update information corresponding to the selected EAP authentication method. Note that the update of the personal screen 190 described below is also realized with the same methods described above.

The user can additionally change the content information of the other respective setting items 100, 102, 106 to 118 based on the foregoing updated enterprise screen 90. For example, the user can operate the buttons 100a, 102a, 108a, 114a, 116a and change the content information of the setting items 100, 102, 108, 114, 116. Moreover, the user can input text into the areas 110a, 112a, 118a and change the content information of the setting items 110, 112, 118. If the selected EAP authentication method is an authentication method other than LEAP, the user can change the content information of the setting item 116 (Server Certificate Verification). The user can operate the button 116a of the setting item 116 and select one mode among "CA Cert.," "CA Cert.+Server ID" and "None." If "CA Cert.+Server ID" is selected by the user, the enterprise screen 90 is updated so that the character string (Server ID) indicating the setting item 118 is displayed in a color that is the same as the other character strings. The user is able to thereby recognize that the server ID needs to be set. Meanwhile, if "CA Cert." or "None" is selected by the user, the enterprise screen 90 is updated so that the character string (Server ID) indicating the setting item 118 is displayed in a color that is lighter than the other character strings.

The user can operate the operating unit 42 to operate the Submit button 122. When the Submit button 122 is operated, the controlling unit 50 of the PC 40 sends operating information indicating that the Submit button 122 was operated to the multi-function device 10. Moreover, the controlling unit 50 of the PC 40 sends the wireless setting which was changed by the user (specifically, screen data of the enterprise screen 90 which is displayed when the Submit button 122 was operated) to the multi-function device 10. Note that, if the Cancel button 120 is operated, the controlling unit 50 of the PC 40 sends operating information indicating that the Cancel button 120 was operated to the multi-function device 10.

Configuration of Personal Screen

As shown in FIG. 6, the personal screen 190 includes, similar to the enterprise screen 90, a status display area 196 and a setting display area 198. The respective pieces of information displayed on the status display area 196 are the same as the respective pieces of information displayed on the status display area 96 of the enterprise screen 90. A plurality of setting items 200 to 212 is displayed on the setting display area 198. Each of the setting items 200 to 212 is an association of a character string indicating that setting item, and content information. The setting items 200 to 202 are the same as the setting items 100 to 102 of the enterprise screen 90. Moreover, as with the setting items 104, 108 of the enterprise screen 90, the setting display area 198 includes a setting item 204 (Authentication Method) indicating the personal type authentication method ("Shared Key" in the example of FIG. 6) being set in the multi-function device 10, and a setting item 208 (Encryption Mode) indicating the encryption method ("WEP" in the example of FIG. 6) being set in the multi-function device 10. Note that the setting display area 198 does not include the setting items corresponding to the setting items 106, 110, 112, 114, 116, 118 of the enterprise screen 90, and rather includes a setting item 210 (Network Key Use) indicating the WEP Key being set in the multi-function device 10, and a setting item 212 (Passphrase) indicating the passphrase being set in the multi-function device 10.

The user can operate the operating unit 42 (refer to FIG. 1) of the PC 40 and change the content information of the plurality of setting items 202 to 212 displayed on the personal screen 190. For example, the user can operate the buttons 204a, 208a and change the setting item 204 (Authentication Method), the setting item 208 (Encryption Mode) and so on. Note that, as with the case of the enterprise screen 90, the personal screen 190 is updated according to the changed contents. Specifically, the personal screen 190 is updated so that the character strings indicating the setting items that need to be set by the user are displayed in a mode that is different from the character strings indicating the setting items that do not need to be set by the user. Moreover, the user can change the content information of the setting items 210, 212 by inputting one or more text in the areas 210a, 212a.

As with the case of the enterprise screen 90, if the Submit button 222 is operated by the user, the controlling unit 50 of the PC 40 sends operating information indicating that the Submit button 222 was operated and the wireless setting that was changed by the user (specifically, screen data of the personal screen 190 that is displayed when the Submit button 222 was operated) to the multi-function device 10. Note that, if the Cancel button 220 is operated, the controlling unit 50 of the PC 40 sends operating information indicating that the Cancel button 220 was operated to the multi-function device 10.

If the personal screen 190 is displayed on the displaying unit 44, specifically, if the personal type wireless setting is currently set in the multi-function device 10, there is a case where the user wishes to change the wireless setting of the multi-function device 10 to the enterprise type wireless setting. In the foregoing case, the user operates the Enterprise tab 94 included in the personal screen 190. The controlling unit 50 of the PC 40 thereby causes the displaying unit 44 to display the enterprise screen 90 in substitute for the personal screen 190. This update is also realized with the foregoing methods. Note that nothing is displayed or default contents are displayed in the area for displaying the content information of the respective setting items 100 to 118 contained in the enterprise screen 90 that is displayed here. This is because the personal type wireless setting, and not the enterprise type wireless setting, is currently set in the multi-function device 10. The user can designate the content information of the respective setting items 100 to 118 of the enterprise type wireless setting via the enterprise screen 90. If the Submit button 122 is thereafter operated, the controlling unit 50 of the PC 40 sends the enterprise type wireless setting designated by the user to the multi-function device 10.

Meanwhile, if the enterprise screen 90 is displayed on the displaying unit 44, specifically, if the enterprise type wireless setting is currently set in the multi-function device 10, there is a case where the user wishes to change the wireless setting of the multi-function device 10 to the personal type wireless setting. In the foregoing case, the user operates the Personal tab 92 contained in the enterprise screen 90. The controlling unit 50 of the PC 40 thereby causes the displaying unit 44 to display the personal screen 190 in substitute for the enterprise screen 90. This update is also realized with the foregoing methods. Note that nothing is displayed or default contents are displayed in the area for displaying the content information of the respective setting items 200 to 212 contained in the personal screen 190 that is displayed at this occasion. The user can designate the contents of the respective setting items 200 to 212 of the personal type wireless setting via the personal screen 190. If the Submit button 222 is thereafter operated, the controlling unit 50 of the PC 40 sends the personal type wireless setting designated by the user to the multi-function device 10.

Returning to FIG. 3, the contents of the setting change process are explained. When the controlling device 20 provides the screen data of the enterprise screen 90 to the PC 40 at S20, the controlling device 20 monitors the reception of operating information indicating that the Submit button 122 (refer to FIG. 5) was operated from the PC 40 (S22). If the controlling device 20 receives operating information indicating that the Cancel button 120 was operated, it determines that the result is NO at S22, and ends the process. Meanwhile, if the controlling device 20 receives operating information indicating that the Submit button 122 was operated, it determines that the result is YES at S22, and proceeds to S24. Note that if the result is YES at S22 as described above, the controlling device 20 receives the enterprise type wireless setting (wireless setting that has been changed by the user) from the PC 40. At S24, the deciding unit 28 performs error decision process (refer to FIG. 7) to the enterprise type wireless setting received from the PC 40. Note that the enterprise type wireless setting that is the target used for the error decision process is hereinafter referred to as the "specific wireless setting." Subsequently, the controlling device 20 determines whether it was decided that there is no error in the error decision process (S26). If the result is NO in the foregoing case (i.e., if it is decided that there is an error), the routine returns to S20, and, if the result is YES (i.e., if it is decided that is no error), the routine proceeds to S28. At S28, the supplying unit 24 supplies the foregoing specific wireless setting to the wireless communication performing unit 32, and ends the process. The wireless communication performing unit 32 stores the foregoing specific wireless setting. Specifically, a new enterprise type wireless setting (foregoing specific wireless setting) is set in the multi-function device 10. Consequently, the wireless communication performing unit 32 can use the new enterprise type wireless setting to achieve a wireless communication with the enterprise AP 60.

Meanwhile, if the controlling device 20 provides the screen data of the personal screen 190 to the PC 40 at S30, it monitors the reception of operating information indicating that the Submit button 222 (refer to FIG. 6) was operated from the PC 40 (S32). If the controlling device 20 receives operating information indicating that the Cancel button 220 was operated, it determines that the result is NO at S32, and ends the process. Meanwhile, if the controlling device 20 receives operating information indicating that the Submit button 222 was operated from the PC 40, it determines that the result is YES at S32, and proceeds to S34. Note that if the result is YES at S32, the controlling device 20 receives the personal type wireless setting (wireless setting after it was changed by the user) from the PC 40. At S34, the supplying unit 24 supplies the personal type wireless setting received from the PC 40 to the wireless communication performing unit 32, and ends the process. The wireless communication performing unit 32 stores the supplied personal type wireless setting. Specifically, a new personal type wireless setting is set in the multi-function device 10. Consequently, the wireless communication performing unit 32 can use the new personal type wireless setting to achieve a wireless connection with the personal AP 70.

Note that, as described above, even if the screen data of the enterprise screen 90 is provided at S20, if the Personal tab 92 (refer to FIG. 5) is operated and the Submit button 222 (refer to FIG. 6) is further operated, the controlling device 20 receives the personal type wireless setting from the PC 40. In the foregoing case, although not shown in the flowchart, the controlling device 20 proceeds to S34, and supplies the personal type wireless setting to the wireless communication performing unit 32. Contrarily, even if the screen data of the personal screen 190 is provided at S30, if the Enterprise tab 94 (refer to FIG. 6) is operated and the Submit button 122 (refer to FIG. 5) is further operated, the controlling device 20 receives the enterprise type wireless setting from the PC 40. In the foregoing case, the controlling device 20 proceeds to S24, and performs the error decision process (refer to FIG. 7) to the enterprise type wireless setting received from the PC 40. The enterprise type wireless setting that is the target used for the error decision process in the foregoing case is also referred to as the "specific wireless setting."

Error Decision Process Performed by Multi-Function Device

Figure 3:
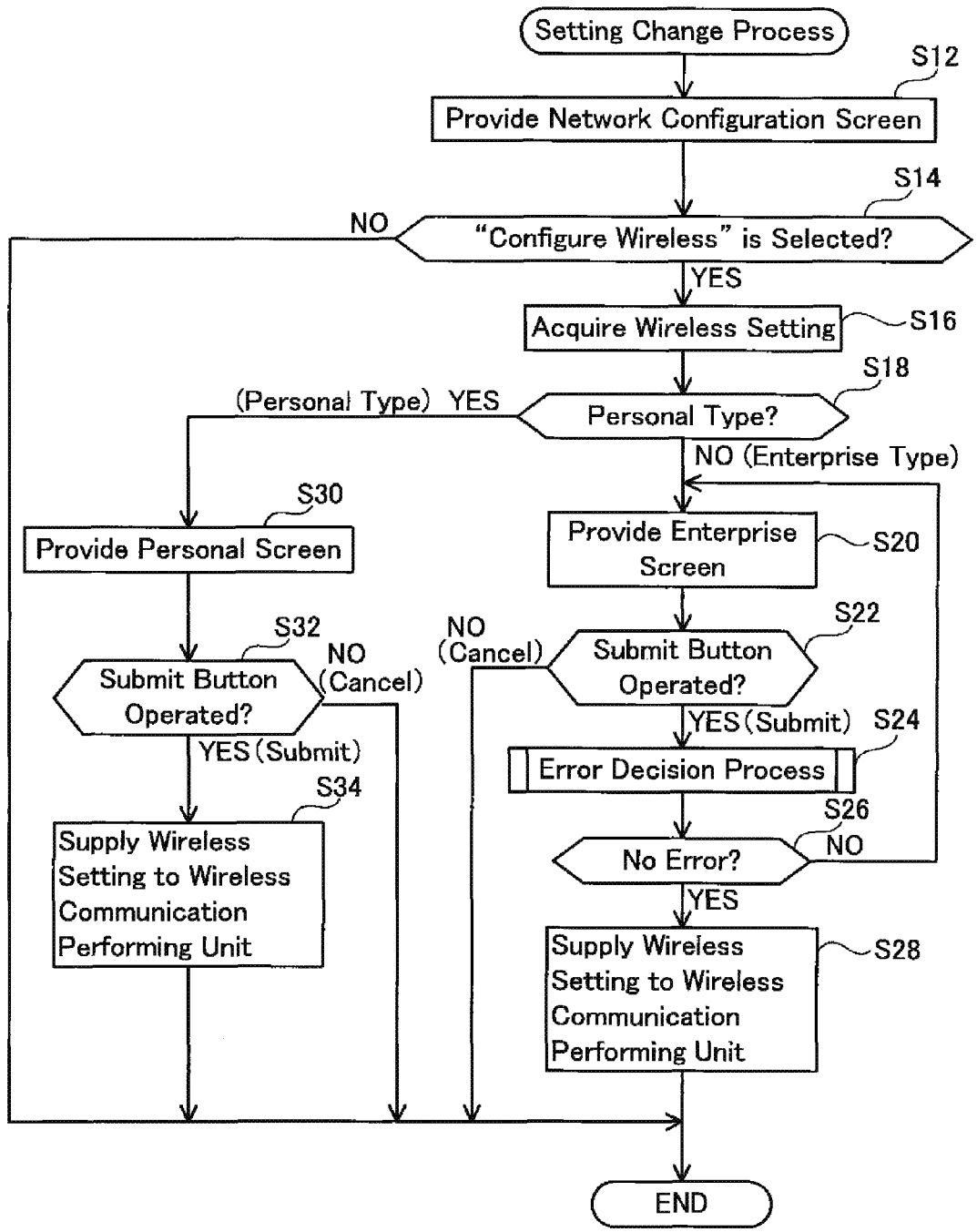
FIG. 3 shows a flowchart of a setting change process performed by a multi-function device.

The error decision process of S24 of FIG. 3 is now explained with reference to FIG. 7. The deciding unit 28 (refer to FIG. 1) foremost decides whether the user ID (content of the setting item 110 (User ID) of FIG. 5) (refer to FIG. 8) is currently input (S44). Specifically, the deciding unit 28 determines whether the user ID is described as the content information of the setting item 110 included in the foregoing specific wireless setting. If the result is NO at S44, the providing unit 30 (refer to FIG. 1) provides screen data indicating an input error of the user ID to the PC 40 (S46), and ends the error decision process. Here, the controlling unit 50 of the PC 40 causes to the displaying unit 44 to display a screen indicating the input error of the user ID.

Meanwhile, if the result is YES at S44, the deciding unit 28 decides whether the content information of the setting item 104 (Authentication Method) included in the foregoing specific wireless setting indicates EAP-TLS (S48). If the result is YES in the foregoing case, the routine proceeds to S50, and if the result is NO in the foregoing case, the routine proceeds to S54. At S50, the deciding unit 28 decides whether the client certificate (content of the setting item 114 (Client Certificate) of FIG. 5) (refer to FIG. 8) is set. Specifically, the deciding unit 28 decides whether the certificate ID of the client certificate is selected as the content information of the setting item 114 included in the foregoing specific wireless setting. If the result is NO at S50, the providing unit 30 provides a screen indicating a setting error of the certificate to the PC 40 (S52), and ends the error decision process. Here, the controlling unit 50 of the PC 40 displays a screen indicating the setting error of the certificate on the displaying unit 44. Meanwhile, if the result is YES at S50, the routine proceeds to S60 (described later).

At S54, the deciding unit 28 decides whether a password configured from a predetermined number of characters or less (content of the setting item 112 (Password) of FIG. 5) (refer to FIG. 8) is currently input. Specifically, the deciding unit 28 decides whether a password configured from a predetermined number of characters or less is described as the content information of the setting item 112 included in the foregoing specific wireless setting. If the result is NO at S54, the providing unit 30 provides a screen indicating an input error of the password to the PC 40 (S58), and ends the error decision process. The controlling unit 50 of the PC 40 causes the displaying unit 44 to display a screen indicating the input error of the password. Meanwhile, if the result is YES at S54, the deciding unit 28 decides whether the content information of the setting item 104 (Authentication Method) included in the foregoing specific wireless setting indicates EAP-FAST, PEAP, or EAP-TTLS (S56). If the result is YES in the foregoing case, the routine proceeds to S60, and, if the result is NO (i.e., if the content information of the setting item 104 is LEAP), the routine proceeds to S72.

At S60, the deciding unit 28 decides whether the content information of the setting item 116 (Server Certificate Verification) (refer to FIG. 8) included in the foregoing specific wireless setting indicates "CA Cert." or "CA Cert.+Server ID." If the result is YES in the foregoing case, the routine proceeds to S62, and, if the result is NO in the foregoing case (content information of the setting item 116 (Server Certificate Verification) indicates "None"), the routine proceeds to S72. At S62, the deciding unit 28 decides whether the CA certificate for authenticating the authentication server 62 is installed in the multi-function device 10. If the result is YES in the foregoing case, the routine proceeds to S66, and, if the result is NO in the foregoing case, the routine proceeds to S64. At S64, the providing unit 30 provides a screen indicating an error to the effect that the CA certificate is not installed to the PC 40, and ends the error decision process. The controlling unit 50 of the PC 40 causes the displaying unit 44 to display a screen indicating that the CA certificate is not installed. At S66, the deciding unit 28 decides whether the content information of the setting item 116 (Server Certificate Verification) (refer to FIG. 8) included in the foregoing specific wireless setting indicates "CA Cert.+Server ID." If the result is YES in the foregoing case, the routine proceeds to S68, and, if the result is NO in the foregoing case, the routine proceeds to S72. At S68, the deciding unit 28 decides whether the server ID (content of the setting item 118 (Server ID) of FIG. 5) is currently input. Specifically, the deciding unit 28 decides whether the server ID is described as the content information of the setting item 118 included in the foregoing specific wireless setting. If the result is NO at S68, the providing unit 30 provides a screen indicating an input error of the server ID to the PC 40 (S70), and ends the error decision process. The controlling unit 50 of the PC 40 causes the displaying unit 44 to display a screen indicating the input error of the server ID. Meanwhile, if the result is YES at S68, the routine proceeds to S72. At S72, the providing unit 30 provides a screen indicating that the setting is complete to the PC 40, and ends the error decision process. The controlling unit 50 of the PC 40 displays a screen indicating that the setting is complete on the displaying unit 44. According to the foregoing configuration, an error decision is made if the setting items are changed to an erroneous content. Thus, it is possible to inhibit the wireless setting of the multi-function device 10 from being changed to an erroneous content.

Figure 7:
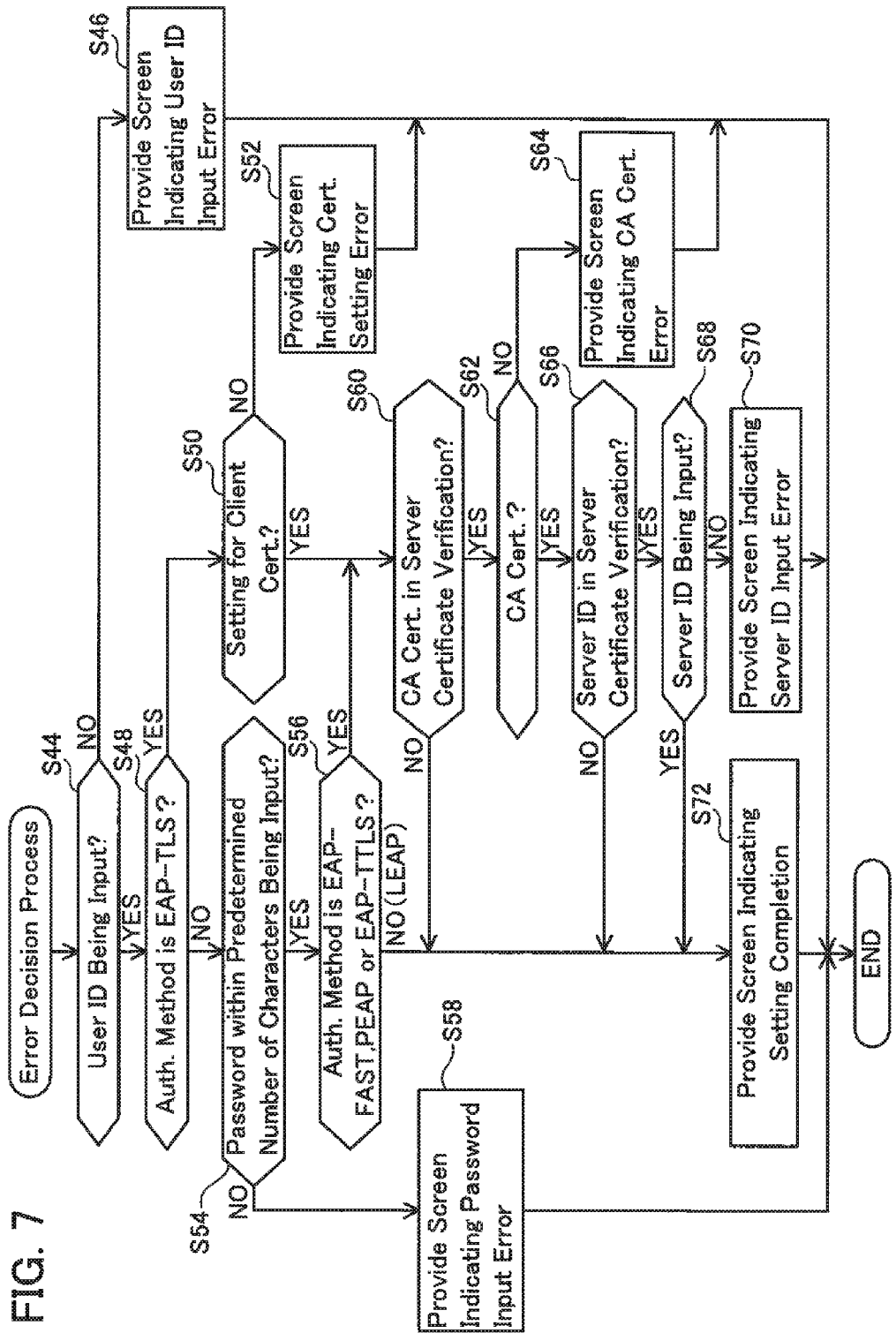
FIG. 7 shows a flowchart of an error decision process performed by the multi-function device.

With the error decision process of FIG. 7, the target setting items used for the error decision will differ depending on the type of the EAP authentication method. FIG. 8 shows a list of the target setting items used for the error decision in the error decision process of FIG. 7. The symbol "o" in FIG. 8 indicates the setting item that is the target used for the error decision, and the symbol "x" indicates the setting item that is not the target used for the error decision. For example, if the EAP authentication method is LEAP, the user ID and the password (setting items 110, 112 of FIG. 5) are the target setting items used for the error decision, and the client certificate, the server certificate, and the server ID (setting items 114, 116, 118 of FIG. 5) are the setting items that are not the target used for the error decision. Moreover, if the EAP authentication method is EAP-FAST, PEAP, EAP-TTLS, or EAP-TLS and the content of the setting item 116 (Server Certificate Verification) of FIG. 5 is "None" or "CA Cert." (corresponds to "Server ID Setting: No"), the server ID is not included in the target setting items used for the error decision. Meanwhile, if the content of the setting item 116 of FIG. 5 is "CA Cert.+Server ID" (corresponds to "Server ID Setting: Yes"), the server ID is included in the target setting items used for the error decision. In other words, if the content of the setting item 104 (Authentication Method; an example of a specific setting item) indicates EAP-TLS (example of the first authentication method) (YES at S48 of FIG. 7), the setting item 114 (Client Certificate; an example of the first setting item) is adopted as a target setting item used for the error decision at S50 of FIG. 7, and, if the content of the setting item 104 (Authentication Method) indicates EAP-FAST, PEAP, or EAP-TTLS (an example of the second authentication method) (NO at S48 of FIG. 7), the setting item 114 is not adopted as a target setting item used for the error decision, and the setting item 112 (Password; an example of the second setting item) is adopted as a target setting item used for the error decision at S54 of FIG. 7.

Moreover, in a case where the content of the setting item 104 (Authentication Method) indicates EAP-TLS (YES at S48 of FIG. 7), (a) if the setting item 116 (Server Certificate Verification; an example of the third setting item) indicates "CA Cert.+Server ID" (an example of a specific content) (YES at S66 of FIG. 7), in addition to the setting item 114 (Client Certificate), the setting item 118 (Server ID; an example of the fourth setting item) is adopted as a target setting item used for the error decision at S68 of FIG. 7, and (b) if the setting item 116 (Server Certificate Verification) does not indicate "CA Cert.+Server ID" (NO at S66 of FIG. 7), the setting item 118 (Server ID) is not adopted as a target setting item used for the error decision.

Moreover, in a case where the content of the setting item 104 (Authentication Method) indicates EAP-FAST, PEAP, or EAP-TTLS (YES at S56 of FIG. 7), (c) if the setting item 116 (Server Certificate Verification) indicates "CA Cert.+Server ID" (an example of a specific content) (YES at S66 of FIG. 7), in addition to the setting item 114 (Client Certificate), the setting item 118 (Server ID) is adopted as a target setting item used for the error decision at S68 of FIG. 7, and (d) if the setting item 116 (Server Certificate Verification) does not indicate "CA Cert.+Server ID" (NO at S66 of FIG. 7), the setting item 118 (Server ID) is not adopted as the target setting item used for the error decision.

An embodiment was explained in detail. The enterprise type of authentication method and the personal type of authentication method normally have different setting items of the wireless setting. Accordingly, if a configuration for providing the same screen to the PC 40 is adopted regardless of whether the current wireless setting indicates the enterprise type of authentication method or the second type of authentication method, there is a possibility that a screen containing setting items that are unrelated to the authentication method indicated by the current wireless setting is provided to the PC 40. In the foregoing case, the user may misunderstand that the foregoing unrelated setting items are included in the current wireless setting. Specifically, the user may not be able to appropriately comprehend the current wireless setting. The multi-function device 10 provides screen data of the enterprise screen 90 to the PC 40 if the currently set wireless setting corresponds to the enterprise type authentication method, and provides screen data of the personal screen 190 to the PC 40 if the currently set wireless setting corresponds to the personal type authentication method. The enterprise screen 90 includes setting items which are required for achieving a wireless connection with the enterprise AP, and does not include setting items that are required for achieving a wireless connection with the personal AP. Contrarily, the personal screen 190 includes setting items which are required for achieving the wireless connection with the personal AP, and does not include setting items that are required for achieving the wireless connection with the enterprise AP. The PC 40 displays the screen of the provided screen data to the displaying unit 44. Consequently, a screen corresponding to the current wireless setting of the multi-function device 10 is displayed on the displaying unit 44. The user is thereby able to easily confirm the wireless setting of the multi-function device 10.

Moreover, if the Configure Wireless 82 of the network configuration screen 80 is selected by the user, the multi-function device 10 provides either the enterprise screen 90 or the personal screen 190 to the PC 40 according to the current wireless setting of the multi-function device 10 (i.e., the wireless setting being stored in the wireless communication performing unit 32). With this configuration, the user may select the common Configure Wireless 82 for either case where the enterprise screen 90 is displayed or the personal screen 190 is displayed on the displaying unit 44. According to the foregoing configuration, the user does not need to select whether to display the enterprise screen 90 or display the personal screen 190. If a configuration that a first selecting area for providing the enterprise screen 90 to the PC 40 and a second selecting area (a selecting area that is different from the first selecting area) for providing the personal screen 190 to the PC 40 are included in the network configuration screen 80 is adopted, the user needs to comprehend in advance as to whether the current wireless setting indicates the enterprise type or the personal type of authentication method, and select the first selecting area or the second selecting area according to the authentication method indicated by the current wireless setting. Meanwhile, according to the foregoing configuration, even if the user does not know whether the current wireless setting is indicating the enterprise type or the personal type of authentication method, the enterprise screen 90 or the personal screen 190 is provided to the PC 40 according to the authentication method indicated by the current wireless setting if the common selecting area (the Configure Wireless 82) is selected.

The multi-function device 10 uses the contents of the respective setting items that were changed via the respective screens 90, 190 to achieve a wireless connection. The user is thereby able to operate the operating unit 42 and easily change the contents of the setting items via the respective screens 90, 190. Moreover, the multi-function device 10 provides to the PC 40 the screens 90, 190, to which the setting items which do not need to be set and the setting items which need to be set are displayed in different modes, according to the contents of the setting items 104. The user who confirmed the screen 90, 190 displayed on the displaying unit 44 is able to easily determine which setting items need to be set.

The multi-function device 10 changes the contents of the target setting items used for the error decision according to the type of the EAP authentication method in the error decision process. It is thereby possible to reduce the process load of the error decision process, and shorten the process time. Moreover, in order to appropriately adopt the target setting items used for the error decision, e.g., in a case where it is the EAP authentication method (e.g., EAP-TLS) which does not require the setting of a password and the password is not set, it is possible to prevent the other setting items (e.g., user ID, client certificate and so on) which need to be set as being decided as an error (when in fact it is not an error) as a result of causing the password to be the target used for the error decision.

As evident from the foregoing explanation, the multi-function device 10 is an example of the wireless communication device. The personal AP 70 is an example of the device which performs wireless communication directly with the wireless communication performing unit. The authentication method information included in the wireless setting is an example of the setting information. The enterprise screen 90, the personal screen 190, and the network configuration screen 80 are respectively examples of the first, the second and the third screens. Moreover, the selecting area 82 of FIG. 4 is an example of the common selecting area.

Modified Examples (1) In the foregoing embodiments, the respective screens 80, 90, 190 are displayed on the displaying unit 44 of the PC 40, but alternatively, the respective screens may also be displayed on the displaying unit 14 of the multi-function device 10. Moreover, in the foregoing embodiment, the multi-function device 10 comprises the controlling device 20, but alternatively, the PC 40 may comprise the function of the controlling device.

(2) In foregoing embodiments, the setting information concerning the wireless setting acquired by the acquiring unit 22 includes a specific authentication method (authentication method information) such as EAP-FAST, but together therewith or alternatively, type information indicating the type of the authentication method may also be included. For example, the type information indicates "1" if it is the enterprise type authentication method, and indicates "0" if it is the personal type authentication method. The determining unit 26 uses the type information and determines the wireless setting at S18 of FIG. 3. Under normal circumstances, the determining unit uses the setting information concerning the wireless setting acquired by the acquiring unit (e.g., authentication method information and type information of the authentication method) to determine whether the wireless setting indicates the first type of authentication method or the second type of authentication method.

(3) In the foregoing embodiments, when the contents of the setting items are changed via the respective screens 90, 190, the controlling device 20 supplies the wireless setting including the content information of the changed setting items to the wireless communication performing unit 32. Nevertheless, the controlling device 20 may also supply only the changed setting items to the wireless communication performing unit 32. The wireless communication performing unit 32 may also update the wireless setting according to the content information included in the supplied setting items.

(4) The controlling device 20 may perform the error decision process in a case where the Submit button 122 of the personal screen 190 is operated. In the foregoing case, the controlling device 20 may change the target setting items used for the error decision according to the content of the setting item 202 (Authentication Method) and perform the error decision process. For example, if the setting item 202 is Shared Key, the setting item 206 (Network Key Use) may be adopted as the target setting item used for the error decision, and the setting item 208 (Passphrase) may not need to be adopted as a setting time of the error decision. Meanwhile, if the setting item 202 is WPA-PSK or WPA2-PSK, the setting item 208 may be adopted as the target setting item used for the error decision, and the setting item 206 may not need to be adopted as a target setting item used for the error decision.

(5) In the foregoing embodiments, if it is decided that there is an error, the controlling device 20 provides screen data indicating the error to the PC 40, and ends the error decision process. Alternatively, if it is decided that there is an error, the controlling device 20 may store the setting items that were decided as an error, and, after performing the error decision to all target setting items used for the error decision, provide screen data indicating that there are one or more errors in the stored setting items to the PC 40.

(6) In the foregoing embodiments, a case was explained where the multi-function device 10 is connected to the personal AP in an infrastructure mode. However, in addition to the above or as an alternative of the above, the multi-function device 10 may be connected to the PC 40 without going through an AP. Specifically, the multi-function device 10 may be connected to the PC 40 in an ad-hoc mode. In this case also, it is determined as YES at S18 of FIG. 3, and the personal screen 190 is provided at S30. In this case, "ad-hoc mode" is displayed in 100*a* of FIG. 5. In this modified example, the PC 40 is an example of the "device which performs wireless communication directly with the wireless communication performing unit."

(7) The techniques of the foregoing embodiments can be applied to the controlling device of other wireless communication devices such as a PC, server, printer, scanner or facsimile in addition to the multi-function device 10.

(8) In the foregoing embodiments, respective units 22 to 32 are realized as a result of the controlling device 20 performing the processes according to the program 18. Nevertheless, at least one unit of respective units 22 to 32 may alternatively be realized by a hardware resource such as a logic circuit.

The invention claimed is:

1. A system comprising:
an enterprise access point;
an authentication server;
a personal access point;
a computer device; and
a wireless communication device,
wherein the wireless communication device comprises:
   a wireless network interface;
   a memory; and
   a processor configured to execute:
      storing wireless setting information in the memory;
      establishing a wireless communication with one of the enterprise access point and the personal access point based on the wireless setting information stored in the memory,
         wherein the wireless setting information is one of first setting information to be used in an enterprise type authentication process and second setting information to be used in a personal type authentication process, the enterprise type authentication process being performed by the authentication server electrically connected to the enterprise access point, the personal type authentication process being performed by the personal access point with which the wireless network interface directly communicates,
         wherein the first setting information is stored in the memory while the wireless communication with the enterprise access point is established, and
         wherein the second setting information is stored in the memory while the wireless communication with the personal access point is established;
      acquiring the wireless setting information stored in the memory, the acquired wireless setting information being currently used in the established wireless communication, the acquired wireless setting information being one of the first setting information and the second setting information and including authentication method information; and
      determining an authentication method by analyzing the authentication method information included in the acquired wireless setting information, the authentication method being one of LEAP, EAP-FAST, PEAP, EAP-TTLS, EAP-TLS, WPA-PSK, WPA2-PSK, Open and Shared Key,
      when the determined authentication method is one of LEAP, EAP-FAST, PEAP, EAP-TILS and EAP-TLS,
         generating a first screen indicating a plurality of setting items included in the acquired wireless setting information, the plurality of setting items being used for the enterprise type authentication process; and
         transmitting the first screen to the computer device; and
      when the determined authentication method is one of WPA-PSK, WPA2-PSK, Open and Shared Key,
         generating a second screen indicating a plurality of setting items included in the acquired wireless setting information, the plurality of setting items being used for the personal type authentication process; and
         transmitting the second screen to the computer device;
wherein the computer device comprises:
   an interface electrically connected with the wireless communication device;
   a memory storing a browser application;
   a display; and
   a processor configured to execute the browser application to implement processes comprising:
      transmitting, via the interface, a request to the wireless communication device for the wireless setting information used in the currently established wireless communication in the wireless communication device;
      receiving, via the interface, one of the first screen and the second screen from the wireless communication device; and
      displaying the received one of the first screen and the second screen in the display.

2. The system as in claim 1,
wherein the processor of the computer device is configured to execute the browser application to implement further processes comprising:
   receiving a user input that indicates changing a content of at least one setting item of the plurality of setting items displayed in the one of the first screen and the second screen, and
   transmitting, via the interface, the changed content of at least one setting item to the wireless communication device,
wherein the processor of the wireless communication device is further configured to execute:
   receiving the changed content of the at least one setting item from the computer device, and
   determining whether contents of a target setting item of the plurality of setting items included in the one of the first screen and the second screen include an error, and wherein the target setting item is determined in accordance with a content of a specific setting item indicating an authentication method in the one of the first screen and the second screen.

3. The system as in claim 2, wherein
the changed content of the at least one setting item is displayed in the first screen,
in a case where the content of the specific setting item included in the first screen indicates EAP-TLS, a first setting item included in the first screen is determined as the target setting item, and
in a case where the content of the specific setting item included in the first screen indicates one of LEAP, EAP-FAST, PEAP, and EAP-TTLS, the first setting item included in the first screen is not determined as the target setting item, and a second setting item included in the first screen is determined as the target setting item.

4. The system as in claim 3, wherein
in the case where the content of the specific setting item included in the first screen indicates EAP-TLS, and
(a) in a case where a content of a third setting item included in the first screen indicates a specific content, a fourth setting item included in the first screen is further determined as the target setting item in addition to the first setting item, and
(b) in a case where the content of the third setting item included in the first screen does not indicate the specific content, the fourth setting item included in the first screen is not determined as the target setting item.

5. The system as in claim 3, wherein
in the case where the content of the specific setting item included in the first screen indicates one of LEAP, EAP-FAST, PEAP, and EAP-TTLS,
(a) in a case where a content of a third setting item included in the first screen indicates a specific content, a fourth setting item included in the first screen is further determined as the target setting item in addition to the second setting item, and
(b) in a case where the content of the third setting item included in the first screen does not indicate the specific content, the fourth setting item included in the first screen is not determined as the target setting item.

6. The system as in claim 3, wherein in both cases where the content of the specific setting item included in the first screen indicates EAP-TLS and where the content of the specific setting item included in the first screen indicates one of LEAP, EAP-FAST, PEAP, and EAP-TTLS, a third setting item included in the first screen is determined as the target setting item.

7. The system as in claim 1, wherein the processor of the wireless communication device is further configured to execute:
transmitting a third screen to the computer device before transmitting the first screen or the second screen to the computer device,
wherein the third screen includes a common selecting area capable of being selected by a user for transmitting the first screen or the second screen to the computer device, and
in a case where the common selecting area is selected by the user, the processor of the wireless communication device executes the acquiring the wireless setting information, the determining the authentication method and the transmitting the first screen or the second screen.

8. The system as in claim 1,
wherein the processor of the computer device is configured to execute the browser application to implement further processes comprising:
receiving a user input that indicates changing a content of at least one setting item of the plurality of setting items displayed in the one of the first screen and the second screen; and
transmitting, via the interface, the changed content of at least one setting item to the wireless communication device,
wherein the processor of the wireless communication device is further configured to execute:
receiving the changed content of the at least one setting item from the computer device; and
storing the changed content of the at least one setting item to the memory such that the wireless communication device performs a wireless communication using the changed content.

9. A wireless communication device comprising:
a wireless network interface;
a memory; and
a processor configured to execute:
storing wireless setting information in the memory;
establishing a wireless communication with one of an enterprise access point and a personal access point based on the wireless setting information stored in the memory,
wherein the wireless setting information is one of first setting information to be used in an enterprise type authentication process and second setting information to be used in a personal type authentication process, the enterprise type authentication process being performed by an authentication server electrically connected to the enterprise access point, the personal type authentication process being performed by the personal access point with which a wireless network interface directly communicates,
wherein the first setting information is stored in the memory while the wireless communication with the enterprise access point is established, and
wherein the second setting information is stored in the memory while the wireless communication with the personal access point is established;
acquiring the wireless setting information stored in the memory, the acquired wireless setting information being currently used in the established wireless communication, the acquired wireless setting information being one of the first setting information and the second setting information and including authentication method information; and
determining an authentication method by analyzing the authentication method information included in the acquired wireless setting information, the authentication method being one of LEAP, EAP-FAST, PEAP, EAP-TTLS, EAP-TLS, WPA-PSK, WPA2-PSK, Open and Shared Key,
when the determined authentication method is one of LEAP, EAP-FAST, PEAP, EAP-TILS and EAP-TLS,
generating a first screen indicating a plurality of setting items included in the acquired wireless setting information, the plurality of setting items being used for the enterprise type authentication process; and
transmitting the first screen to a computer device; and
when the determined authentication method is one of WPA-PSK, WPA2-PSK, Open and Shared Key, generating a second screen indicating a plurality of setting items included in the acquired wireless setting information, the plurality of setting items being used for the personal type authentication process; and transmitting the second screen to the computer device.

10. The wireless communication device as in claim 9, wherein the processor is further configured to execute:
receiving changed content of at least one setting item from the computer device, and
determining whether contents of a target setting item of the plurality of setting items included in the one of the first screen and the second screen include an error,
wherein the target setting item is determined in accordance with a content of a specific setting item indicating an authentication method in the one of the first screen and the second screen.

11. The wireless communication device as in claim 10, wherein
in a case where the content of the specific setting item included in the first screen indicates EAP-TLS, a first setting item included in the first screen is determined as the target setting item, and
in a case where the content of the specific setting item included in the first screen indicates one of LEAP, EAP-FAST, PEAP, and EAP-TTLS, the first setting item included in the first screen is not determined as the target setting item, and a second setting item included in the first screen is determined as the target setting item.

12. The wireless communication device as in claim 11, wherein
in the case where the content of the specific setting item included in the first screen indicates EAP-TLS, and
(a) in a case where a content of a third setting item included in the first screen indicates a specific content, a fourth setting item included in the first screen is further determined as the target setting item in addition to the first setting item, and
(b) in a case where the content of the third setting item included in the first screen does not indicate the specific content, the fourth setting item included in the first screen is not determined as the target setting item.

13. The wireless communication device as in claim 11, wherein
in the case where the content of the specific setting item included in the first screen indicates one of LEAP, EAP-FAST, PEAP, and EAP-TTLS,
(a) in a case where a content of a third setting item included in the first screen indicates a specific content, a fourth setting item included in the first screen is further determined as the target setting item in addition to the second setting item, and
(b) in a case where the content of the third setting item included in the first screen does not indicate the specific content, the fourth setting item included in the first screen is not determined as the target setting item.

14. The wireless communication device as in claim 11, wherein in both cases where the content of the specific setting item included in the first screen indicates EAP-TLS and where the content of the specific setting item included in the first screen indicates one of LEAP, EAP-FAST, PEAP, and EAP-TTLS, a third setting item included in the first screen is determined as the target setting item.

15. The wireless communication device as in claim 9, wherein the processor is further configured to execute:
transmitting a third screen to the computer device before transmitting the first screen or the second screen to the computer device,
wherein the third screen includes a common selecting area capable of being selected by a user for transmitting the first screen or the second screen to the computer device, and
in a case where the common selecting area is selected by the user, the processor executes the acquiring the wireless setting information, the determining the authentication method and the transmitting the first screen or the second screen.

16. The wireless communication device as in claim 9, wherein the processor is further configured to execute:
receiving changed content of at least one setting item from the computer device; and
storing the changed content of the at least one setting item to the memory such that the wireless communication device performs a wireless communication using the changed content.

17. A non-transitory computer readable medium including a computer program for wireless communication device, wherein the computer program, when executed by one or more processors of the wireless communication device, causes the wireless communication device to:
store wireless setting information in a memory of the wireless communication device;
establish a wireless communication with one of an enterprise access point and a personal access point based on the wireless setting information stored in the memory,
wherein the wireless setting information is one of first setting information to be used in an enterprise type authentication process and second setting information to be used in a personal type authentication process, the enterprise type authentication process being performed by an authentication server electrically connected to the enterprise access point, the personal type authentication process being performed by the personal access point with which a wireless network interface directly communicates,
wherein the first setting information is stored in the memory while the wireless communication with the enterprise access point is established, and
wherein the second setting information is stored in the memory while the wireless communication with the personal access point is established;
acquire the wireless setting information stored in the memory, the acquired wireless setting information being currently used in the established wireless communication, the acquired wireless setting information being one of the first setting information and the second setting information and including authentication method information; and
determine an authentication method by analyzing the authentication method information included in the acquired wireless setting information, the authentication method being one of LEAP, EAP-FAST, PEAP, EAP-TTLS, EAP-TLS, WPA-PSK, WPA2-PSK, Open and Shared Key,
when the determined authentication method is one of LEAP, EAP-FAST, PEAP, EAP-TILS and EAP-TLS,
generate a first screen indicating a plurality of setting items included in the acquired wireless setting information, the plurality of setting items being used for the enterprise type authentication process; and transmit the first screen to a computer device; and
when the determined authentication method is one of WPA-PSK, WPA2-PSK, Open and Shared Key,
generate a second screen indicating a plurality of setting items included in the acquired wireless setting information, the plurality of setting items being used for the personal type authentication process; and
transmit the second screen to the computer device.

18. The non-transitory computer readable medium as in claim 17, wherein the computer program, when executed by the one or more processors of the wireless communication device, further causes the wireless communication device to:
receive changed content of at least one setting item from the computer device, and
determine whether contents of a target setting item of the plurality of setting items included in the one of the first screen and the second screen include an error, and
wherein the target setting item is determined in accordance with a content of a specific setting item indicating an authentication method in the one of the first screen and the second screen.

19. The non-transitory computer readable medium as in claim 18, wherein
in a case where the content of the specific setting item included in the first screen indicates EAP-TLS, a first setting item included in the first screen is determined as the target setting item, and
in a case where the content of the specific setting item included in the first screen indicates one of LEAP, EAP-FAST, PEAP, and EAP-TTLS, the first setting item included in the first screen is not determined as the target setting item, and a second setting item included in the first screen is determined as the target setting item.

20. The non-transitory computer readable medium as in claim 17, wherein the computer program, when executed by the one or more processors of the wireless communication device, further causes the wireless communication device to:
transmit a third screen to the computer device before transmitting the first screen or the second screen to the computer device,
wherein the third screen includes a common selecting area capable of being selected by a user for transmitting the first screen or the second screen to the computer device, and
the acquiring the wireless setting information, the determining the authentication method and the transmitting the first screen or the second screen are performed in a case where the common selecting area is selected by the user.

* * * * *